Patented May 29, 1951

2,555,257

UNITED STATES PATENT OFFICE 2,555,257

CURE-ACTIVATION COMPOSITIONS

Edward A. Van Valkenburgh, New York, N. Y.

No Drawing. Application October 21, 1947,
Serial No. 781,250

3 Claims. (Cl. 106—239)

This invention relates to new compositions which are valuable cure-activating plasticizers for natural and synthetic rubber compounding and which are also useful for other purposes.

The new compositions are made from heat-treated crude tall oil, diluted with a hydrocarbon diluent, and over-neutralized with an aliphatic polyamine containing both terminal amine groups and intermediate secondary amine or imino groups. Particularly valuable compositions are made by over-neutralizing the heat-treated and diluted tall oil acids with a regulated excess of tetraethylene pentamine.

The crude tall oil used in making the new compositions is a heat-treated tall oil, and the heat-treated tall oil is then diluted with a regulated amount of a non-volatile coal tar oil or petroleum hydrocarbon oil before being subjected to the over-neutralization treatment. Crude tall oil is produced as a byproduct from the paper pulp industry and is made up largely of resin acids and fatty acids with smaller amounts of unsaponifiable material such as sterols and high molecular weight aliphatic alcohols. Such crude products form a semi-solid, non-homogeneous mass on standing, with a tendency to separate into an upper liquid and lower solid or semi-solid layer.

I have found that heat treatment of the crude tall oil is essential, prior to over-neutralization, to insure "over-melting" of all solid particles in the crude product. This heat-treatment or over-melting tends to bring about a change in composition and to induce simultaneous dehydrogenation and dihydrogenation. Such heat-treated tall oil is diluted with a non-volatile hydrocarbon oil diluent prior to the over-neutralization treatment with the polyamine, such as a paraffine base petroleum fraction having a boiling point range of about 300 to 350° F.

The polyamines which are used for the over-neutralization treatment of the heat treated and diluted crude tall oil are polyalkylene polyamines which contain two terminal primary amine groups and intermediate secondary amine or imine groups, such as triethylene tetramine, and particularly tetraethylene pentamine.

The amount of such polyamine used for over-neutralization is a regulated excess over that required for combining with all of the fatty acids of the tall oil to form diacid amine soaps by reaction of the acids with the two primary amine groups of the polyamine. The excess of polyamine, calculated solely on the basis of the two terminal primary amine groups, and without including the secondary intermediate amine groups which are less reactive, is in general at least 5% in excess of the equivalent amount and is advantageously from 10% to 25% or 30% in excess.

The new, over-neutralized heat-treated and diluted crude tall oil has valuable cure-activating and plasticizing properties for natural and synthetic rubber compounding, and as processing aids in synthetic resin compositions. They are also valuable for coating pigments for use in rubber compounding.

The new compositions are particularly valuable in connection with the processes of Buna S or GR-S synthetic rubber which is notably deficient in uncured tackiness. The new compositions are valuable tackifying agents.

It is known that rosin acids provide desirable tackiness and give improved cut-growth resistance to vulcanized products and improved flex-life in the case of synthetic rubber tires, and particularly GR-S tires or tires made from GR-S synthetic rubber and natural rubber blends. But it is also well known that rosin acids cause a detrimental, highly undesirable retardation of cure.

The improved compositions of the present invention obviate this cure-retardation and contribute valuable cure-activating effects, while also providing desirable tackiness, improvement in cut-growth resistance, and greatly improved flex-life.

The use of crude tall oil, after heat treatment, has the advantage of providing a relatively high percentage of rosin acids, as well as of fatty acids, but with the conversion of these acids into over-neutralized products which overcomes retardation of the rate of cure and provides substantial cure-activation and other desirable improvements in flex resistance, particularly of GR-S synthetic rubber tire treads.

As an example of the crude tall oil acids, they may contain around 42%–50% by weight of rosin acids, with a saponification number ranging from about 155–175 and an acid number ranging from about 155 to 170. There is some variation, however, in the acid number of the crude tall oil products, and to insure uniform rubber cure-activation it is important to use a constant or uniform excess of amine for the over-neutralization, in excess of the molar equivalent required to neutralize the mixed acids present and to form diacid amine soaps with the aliphatic polyamines. Variation in the amount of acids and of the diacid amine soaps does not appear so important as variations in the amount of excess amine.

Accordingly, for uniformity of results, a uniform excess of amines should be used, in excess of that required for neutralization on the basis of molar equivalency (two fatty acids for one polyamine containing two terminal primary amine groups).

The invention will be further illustrated by the following specific examples, but it will be understood that the invention is not limited thereto.

*Example I*

The crude tall oil used had an acid number of 155. This crude tall oil is heated at 350° F. with efficient agitation for half an hour to effect the heat treatment and modification of the product. To this heat-treated crude tall oil, the non-volatile hydrocarbon oils are added with continued agitation and without further heating. The hydrocarbon oil added serves to cool the mixture, and when the temperature of the batch has dropped to 150° F., the aliphatic polyamine is added well below the surface, with continued agitation, at such a slow rate that the exothermic heat of reaction does not increase the temperature of the batch above 180° F.

After all of the amine has been thus incorporated, the agitation is continued, advantageously with cooling by circulation through an outside cooling unit, or by air agitation, until the temperature has fallen to about 100° F., when the resulting homogeneous liquid product can be charged into drums or tank cars or other containers.

Two compositions, indicated below as A and B, were produced by this procedure, using the amounts of heat-treated crude tall oil, hydrocarbon diluent, and tetraethylene pentamine indicated by the following table:

|  | A | B |
|---|---|---|
| Crude Tall Oil | 100 | 100 |
| Petroleum Oil | 150 | 60 |
| Coal Tar Oil | 4.82 | |
| Tetraethylene Pentamine | 32.75 | 32.75 |

The amount of tetraethylene pentamine used with the crude tall oil having an acid number of 155 represents about 125% over-neutralization, calculated solely on the basis of the two terminal primary amine groups, and disregarding the three intermediate secondary amine groups. On this basis of molar equivalence of the acids present, and considering only the primary amine groups, this corresponds to an excess of amine reagent equivalent to an acid number of 38.75.

In the resulting over-neutralized product, the acids, both fatty and resin acids, are combined with the polyamine largely or mainly as diacid amine soaps. The excess amine may be present to some extent as free amine and may be present to some extent as monoacid amine soaps of the polyamines. It is probable that the excess amine is combined to a large extent as monoacid amine soaps which have only one terminal primary amine combined with a fatty acid, and which have the other terminal amine group free, together with free intermediate secondary amine groups.

Tetraethylene pentamine is a particularly advantageous polyamine for use in making the new over-neutralized compositions.

In general, I consider petroleum hydrocarbon diluents more advantageous than coal tar oil diluents, although compatible, non-volatile coal tar diluents can be used as well as petroleum hydrocarbon diluents. Even with the petroleum hydrocarbon diluents, a small percentage of coal tar oil may be desirable.

The improved cure-activation efficiency and other advantages of the new compositions are illustrated by the following examples:

*Example II*

A blended GR-S synthetic rubber and admixed natural rubber tread compound was prepared of the following ingredients in the following proportions. In this compound, the product marked "Comp. A" was the composition A of Example I, and the product marked "Comp. B" was the composition B of Example I above. The "anti-oxidant mixture of amines" of this table was a blended mixture of three amines, 25% diparamethoxydiphenylamine, 25% diphenylparaphenylenediamine and 50% phenylbetanaphthylamine.

|  | Compound No. | | |
|---|---|---|---|
|  | 1 | 2 | 3 |
| Smoked Sheets | 70 | 70 | 70 |
| GR-S (Buna S) | 30 | 30 | 30 |
| Micronex W-6 Black | 20 | 20 | 20 |
| Statex 93 Black | 27 | 27 | 27 |
| Zinc Oxide | 2.45 | 2.45 | 2.45 |
| Phenyl beta naphthylamine | 0.6 | 0.6 | 0.6 |
| Anti-oxidant mixture of amines | 0.6 | 0.6 | 0.6 |
| Sulfur | 2.25 | 2.25 | 2.25 |
| Benzothiazyl disulfide | 0.80 | 0.80 | 0.80 |
| Stearic Acid | 3 | | |
| Liquid Asphalt | 6.25 | 8.75 | 8.75 |
| Comp. A | | 0.50 | |
| Comp. B | | | 0.50 |

The three compounds listed above were cured at 45 pounds' steam pressure per square inch for the times indicated below, and subjected to test with the results indicated in the following table:

| Cure at 45 lbs. | M 300% | M 500% | Tensile | Per Cent Elongation | Durometer I-30" |
|---|---|---|---|---|---|
| COMPOUND NO. 1 | | | | | |
| 15' | 440 | 1,040 | 2,550 | 810 | 54-48 |
| 30' | 780 | 1,670 | 3,090 | 730 | 58-54 |
| 45' | 960 | 2,000 | 2,930 | 640 | 63-58 |
| 75' | 1,060 | 2,060 | 3,020 | 630 | 63-58 |
| 120' | 1,030 | 2,230 | 3,000 | 600 | 63-58 |
| COMPOUND NO. 2 | | | | | |
| 15' | 520 | 1,200 | 2,650 | 780 | 53-46 |
| 30' | 700 | 1,640 | 2,880 | 710 | 56-52 |
| 45' | 880 | 1,920 | 2,750 | 620 | 58-54 |
| 75' | 840 | 1,750 | 2,750 | 670 | 58-54 |
| 120' | 820 | 1,760 | 2,640 | 670 | 56-52 |
| COMPOUND NO. 3 | | | | | |
| 15' | 560 | 1,360 | 2,830 | 770 | 54-48 |
| 30' | 820 | 1,730 | 2,890 | 690 | 56-54 |
| 45' | 880 | 1,770 | 3,000 | 700 | 57-54 |
| 75' | 830 | 1,710 | 2,720 | 670 | 56-53 |
| 120' | 850 | 1,700 | 2,790 | 710 | 56-53 |

From the above table, it will be seen that compound A, even though diluted with a much larger amount of hydrocarbon diluent than compound B, gave similar activation efficiency. It will also be noted that ½% of the new compositions in Compounds 2 and 3 were superior to 3.0 parts of relatively expensive stearic acid used in Compound No. 1.

Moreover, even with the small percentage of thiazole accelerator used in the above compounds, it is significant that the persistence of the thiazole vulcanization in over-cure is obviated by the use of the new composition, the under-cured modulus values being higher, and the over-cured modulus results being lower than in the case of the control containing stearic acid.

The new compositions of the present invention are useful not only as cure activators, etc., in rubber compounding and vulcanization, but are advantageous coating and wetting agents for coating the surface of powders such as carbon black and zinc oxide for use in rubber compounding and as processing aids for synthetic resin compositions.

I claim:

1. A heat-treated crude tall oil composition containing a hydrocarbon diluent and having the acids of the heat-treated tall oil over-neutralized with an aliphatic polyamine containing two primary amine groups and intermediate secondary amine groups, the over-neutralization corresponding to from about 5% to 30% excess amine over that required for the formation of a diacid amine soap, said composition being in the form of a homogeneous liquid containing the over-neutralized tall oil acids diluted with the hydrocarbon diluent.

2. A heat-treated crude tall oil composition containing a hydrocarbon diluent and having the acids of the heat-treated tall oil over-neutralized with tetraethylene pentamine, the over-neutralization corresponding to from about 5% to 30% excess amine over that required for the formation of a diacid amine soap, said composition being in the form of a homogeneous liquid containing the over-neutralized tall oil acids diluted with the hydrocarbon diluent.

3. A heat-treated crude tall oil composition containing a hydrocarbon diluent and having the acids of the heat-treated tall oil over-neutralized with tetraethylene pentamine, the over-neutralization corresponding to about 25%, said composition being in the form of a homogeneous liquid containing the over-neutralized tall oil acids diluted with the hydrocarbon diluent.

EDWARD A. VAN VALKENBURGH.

REFERENCES CITED

The following references are of record in the file of this patent:

UNITED STATES PATENTS

| Number | Name | Date |
|---|---|---|
| 2,374,700 | Pollak et al. | May 1, 1945 |
| 2,386,867 | Johnson | Oct. 16, 1945 |
| 2,426,220 | Johnson | Aug. 26, 1947 |